(12) United States Patent
Makino et al.

(10) Patent No.: US 6,709,618 B2
(45) Date of Patent: Mar. 23, 2004

(54) METHOD OF MANUFACTURING A RESIN SPRING

(75) Inventors: Hiroki Makino, Wako (JP); Tsutomu Tomizawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 290 days.

(21) Appl. No.: 09/991,659

(22) Filed: Nov. 26, 2001

(65) Prior Publication Data

US 2002/0030304 A1 Mar. 14, 2002

Related U.S. Application Data

(62) Division of application No. 09/280,546, filed on Mar. 30, 1999, now Pat. No. 6,337,043.

(30) Foreign Application Priority Data

Mar. 30, 1998 (JP) ............................................. 10-083582

(51) Int. Cl.⁷ ................................................. B29C 45/14
(52) U.S. Cl. ........................ 264/250; 264/251; 264/267; 264/294
(58) Field of Search ................................ 264/250, 251, 264/267, 294

(56) References Cited

U.S. PATENT DOCUMENTS

| | | | |
|---|---|---|---|
| 2,800,321 A | | 7/1957 | Jarret et al. |
| 3,606,295 A | * | 9/1971 | Appleton ..................... 267/292 |
| 3,831,922 A | * | 8/1974 | Appleton ..................... 267/140 |
| 4,566,678 A | * | 1/1986 | Anderson ................. 267/141.1 |
| 5,082,252 A | | 1/1992 | Miyamoto |
| 5,280,890 A | | 1/1994 | Wydra |
| 5,868,384 A | | 2/1999 | Anderson |
| 5,984,283 A | | 11/1999 | Tsuiki et al. |

FOREIGN PATENT DOCUMENTS

| | | |
|---|---|---|
| JP | 7 502 698 | 3/1995 |
| JP | A10 252824 | 9/1998 |

* cited by examiner

Primary Examiner—Edmund H. Lee
(74) Attorney, Agent, or Firm—Birch, Stewart, Kolasch & Birch, LLP

(57) ABSTRACT

A method of manufacturing a resin spring which can improve close contact between a spring body and inner-pressure generating members to reduce variations in load characteristics due to repeated deformation during use. The method of manufacturing a resin spring includes the steps of forming an elastomer preform having inner closed chambers, compressing the preform by applying an external force to produce a permanently deformed portion to form a spring body having at least one permanently deformed inner chamber, injecting an inner-pressure generating resin into each of the at least one permanently deformed inner chamber of the spring body, and molding the inner-pressure generating resin into an inner-pressure generating member by using the spring body as part of a die.

5 Claims, 3 Drawing Sheets ent contents of which are hereby incorporated by reference and for which priority is claimed under 35

METHOD OF MANUFACTURING A RESIN SPRING

This application is a divisional of application Ser. No. 09/280,546, filed on Mar. 30, 1999, now U.S. Pat. No. 6,337,043, the entire contents of which are hereby incorporated by reference and for which priority is claimed under 35 U.S.C. § 120; and this application claims priority of Application No. 10-083582 filed in Japan on Mar. 30, 1998 under 35 U.S.C. § 119.

BACKGROUND OF THE INVENTION

1. Field of the Invention

The present invention relates to a manufacturing method for a resin spring capable of generating a compressive damping force.

2. Description of Related Art

Resin springs are used at various places where absorption of vibration is required. For example, a compression spring formed of an elastomer described in Japanese Patent (PCT international application) Laid-open No. 7-502698 is produced by joining hollow noncircular bodies together to form a preform, and compressing the preform to orient its molecular structure for the purpose of removing a compressive setting.

However, when reducing the wall thickness of the preform to allow for a large displacement, increased creep occurs causing variations in characteristics. Therefore, sufficient energy absorption cannot be obtained.

To cope with this problem, the present Applicant has proposed a method of inserting inner-pressure generating members into the hollow portions of the resin spring (Japanese Patent Application No. 9-64714).

By inserting the inner-pressure generating members into the hollow portions of the resin spring, sufficient energy absorption can be obtained with a large displacement, and the creep generated can be reduced.

In the above method, however, the preform is preliminarily compressed to be formed into a spring body having an anti-setting performance. The inner-pressure generating members are then inserted into the hollow portions of the spring body, thereby obtaining the resin spring. Accordingly, there are variations in permanent deformation of the spring body produced by the anti-setting treatment, so that the inner-pressure generating members inserted in the hollow portions of the spring body are not sufficiently in close contact with the spring body. As a result, there is a possibility that the spring body and the inner-pressure generating members inserted therein may slip relative to each other because of repeated deformation in using the resin spring, causing variations in load characteristics of the resin spring.

SUMMARY OF THE INVENTION

It is accordingly an object of the present invention to provide a manufacturing method for a resin spring which can improve the contact between the spring body and the inner-pressure generating members to thereby reduce variations in load characteristics due to repeated deformation in use.

According to a first aspect of the present invention, there is provided a manufacturing method for a resin spring, comprising the steps of forming an elastomer preform having an inner closed chamber; inserting an inner-pressure generating member into the inner closed chamber of the elastomer preform; and compressing the elastomer preform with the inner-pressure generating member by applying an external force to produce a permanently deformed portion having an oriented molecular structure.

After inserting the inner-pressure generating member into the inner closed chamber of the elastomer preform, an external force is applied to the elastomer preform and the inner-pressure generating member in the compressing step to produce permanent deformation and orient the molecular structure of the permanently deformed portion, thus carrying out an anti-setting treatment. Accordingly, by preliminarily making close contact of the inner-pressure generating member with the preform in the inserting step, the inner-pressure generating member is also deformed by deformation of the inner closed chamber of the preform by the external force applied in the compressing step, thereby highly ensuring close contact between the spring body and the inner-pressure generating member. As a result, the slip between the spring body and the inner-pressure generating member can be prevented regardless of repeated deformation in use, thereby obtaining stable load characteristics.

According to a second aspect of the present invention, the inserting step in the manufacturing method for the resin spring of the first aspect of the present invention also comprises injecting an inner-pressure generating resin into the inner closed chamber of the elastomer preform.

The inner-pressure generating resin is injected into the inner closed chamber of the elastomer preform to fill the inner closed chamber, so that the inner-pressure generating member molded from the inner-pressure generating resin is kept in close contact with the preform. Accordingly, close contact between the preform and the inner-pressure generating member is also highly maintained in the compressing step for carrying out the anti-setting treatment. As a result, the slip between the spring body and the inner-pressure generating member can be prevented regardless of repeated deformation in use, thereby obtaining stable load characteristics.

According to a third aspect of the present invention, there is provided a manufacturing method for a resin spring, comprising the steps of integrally forming an elastomer preform and an inner-pressure generating member; and compressing the elastomer preform with the inner-pressure generating member by applying an external force to produce a permanently deformed portion having an oriented molecular structure.

Because the elastomer preform and the inner-pressure generating member are integrally formed with each other, the inner-pressure generating member is in close contact with the elastomer preform prior to the compressing step. Accordingly, the close contact between the preform and the inner-pressure generating member is also highly maintained in the compressing step. As a result, the slip between the spring body and the inner-pressure generating member can be prevented regardless of repeated deformation in use, thereby obtaining stable load characteristics.

According to a fourth aspect of the present invention, the integrally forming step in the manufacturing method for the resin spring of the third aspect of the present invention also comprises integrally forming the elastomer preform and the inner-pressure generating member so as to exhibit a slope function.

The integral body of the preform and the inner-pressure generating member have a slope function, so that the resin spring obtained by compressing the integral body does not have an interface where properties rapidly change. Therefore, the generation of cracks or the like in the resin spring due to stress concentration or the like are suppressed.

According to a fifth aspect of the present invention, there is provided a manufacturing method for a resin spring, comprising the steps of forming an elastomer preform having an inner closed chamber; compressing the elastomer preform by applying an external force to produce a permanently deformed portion whose molecular structure is oriented, thereby forming a spring body having the inner closed chamber deformed; and injecting an inner-pressure generating resin into the inner closed chamber of the spring body and molding the inner-pressure generating resin into an inner-pressure generating member by using the spring body as a part of a die.

The inner-pressure generating resin is injected into the inner closed chamber of the spring body obtained by the compressing step and is molded in this chamber by using the spring body as a part of the die. Accordingly, close contact between the spring body and the inner-pressure generating member can be highly ensured. As a result, the slip between the spring body and the inner-pressure generating member can be prevented regardless of repeated deformation in use, thereby obtaining stable load characteristics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
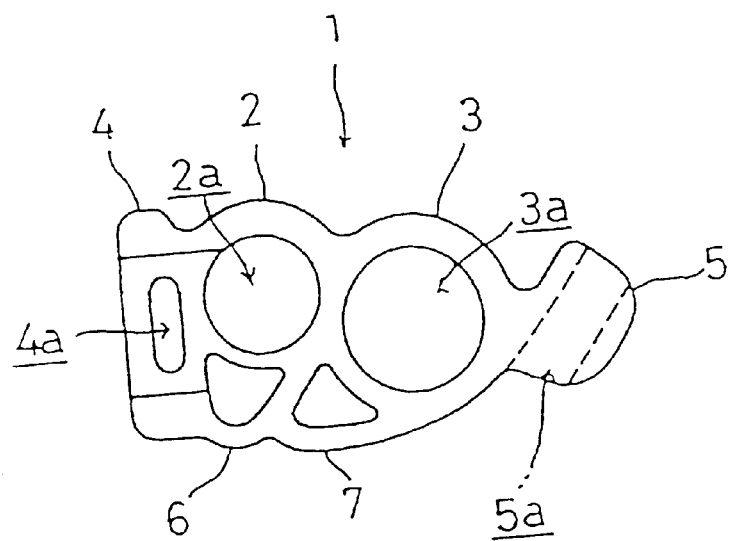
FIG. 1 is a side view of a preform according to a preferred embodiment of the present invention.

A preferred embodiment of the present invention will now be described with reference to FIGS. 1 to 6. Reference numeral 10 generally denotes a resin spring according to a preferred embodiment of the present invention. The resin spring 10 is applied to a wheel suspension for a scooter-type motorcycle. The steps of manufacturing the resin spring 10 will be described in sequence with reference to FIGS. 1 to 5.

In a first step, a polyester elastomer is used to perform injection molding to obtain a preform 1 as shown in FIG. 1. FIG. 1 is a side view of the preform 1.

The preform 1 has two hollow cylindrical portions 2 and 3 formed adjacent to each other in their radial directions, a base portion 4 formed adjacent to the cylindrical portion 2 and having a flat bottom surface, and a flattened projecting portion 5 formed adjacent to the cylindrical portion 3 so as to obliquely project from the cylindrical surface of the cylindrical portion 3.

The base portion 4 is formed with a through hole 4a elongated in a thickness direction and extending in a width direction of the base portion 4. The flattened projecting portion 5 is also formed with a through hole 5a elongated in a width direction and extending in a direction of projection of the flattened projecting portion 5.

The base portion 4 and the cylindrical portion 2 are integrally joined at lower sides thereof as viewed in FIG. 1 by a reinforcing wall 6. Furthermore, the cylindrical portion 2 and the cylindrical portion 3 are integrally joined at lower sides thereof as viewed in FIG. 1 by a reinforcing wall 7.

Figure 2:
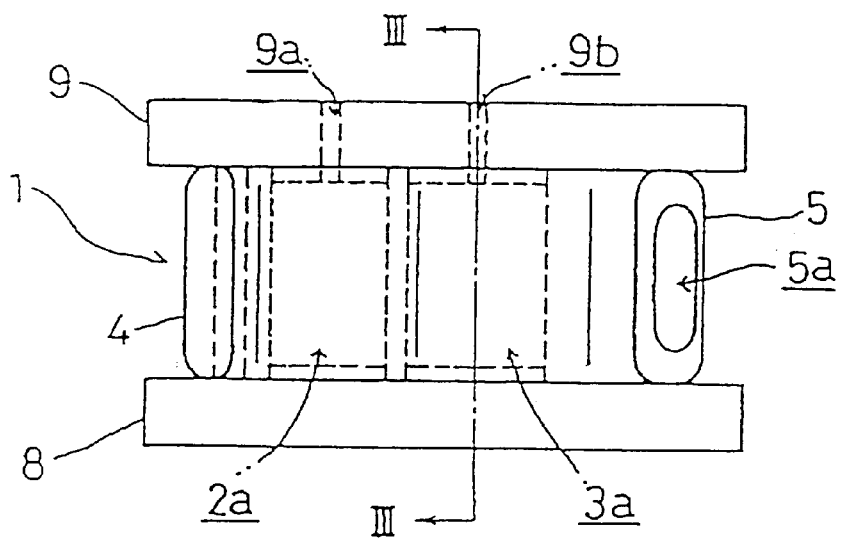
FIG. 2 is a side view showing a condition where upper and lower dies are set on the preform after it is raised.

In a second step, the preform 1 is raised so that the right and left side surfaces become upper and lower surfaces. The preform is then sandwiched by a lower die 8 and an upper die 9 as shown in FIG. 2.

The lower die 8 closes the lower circular openings of the cylindrical portions 2 and 3. The upper die 9 closes the upper circular openings of the cylindrical portions 2 and 3. Therefore, inner closed chambers 2a and 3a are defined.

Figure 3:
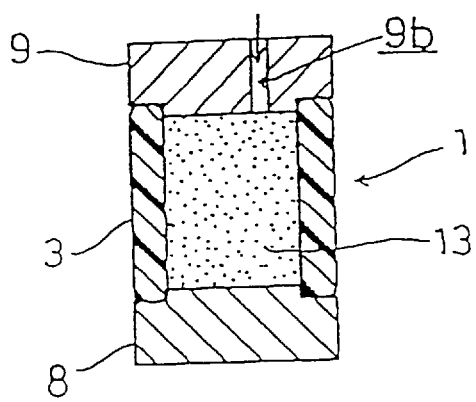
FIG. 3 is a cross section taken along the line III—III in FIG. 2.

The upper die 9 is formed with injection holes 9a and 9b respectively communicating with the inner closed chambers 2a and 3a, respectively. Referring to FIG. 3, a urethane resin and a foaming agent are injected from the injection holes 9a and 9b into the inner closed chambers 2a and 3a, respectively.

The urethane resin is foamed by the forming agent in the inner closed chambers 2a and 3a, thereby forming solid cylindrical inner-pressure generating members 12 and 13 respectively filling the inner closed chambers 2a and 3a.

The inner-pressure generating members 12 and 13 are foamed members which are respectively kept in close contact with the inner circumferential surfaces of the cylindrical portions 2 and 3.

In a third step, an external force is applied to the preform 1 having the inner-pressure generating members 12 and 13 inserted in the inner closed chambers 2a and 3a, respectively, thereby compressing the preform 1 to carry out an anti-setting treatment in the following manner.

Figure 4:
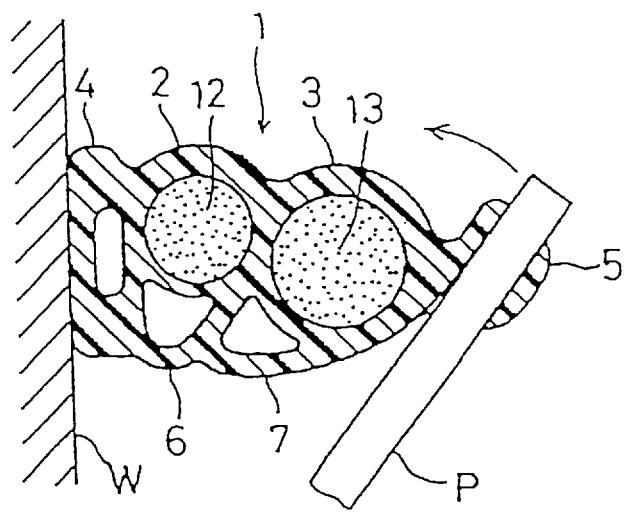
FIG. 4 is a sectional view of the preform and the inner-pressure generating members inserted therein just prior to a compression step.

As shown in FIG. 4, the bottom surface of the base portion 4 is placed in contact with a wall surface W. A pressure plate P is inserted through the elongated hole 5a of the projecting portion 5. In this condition, the pressure plate P is turned toward the wall surface W to compress the preform 1 and the inner-pressure generating members 12 and 13 for a given period of time.

Figure 5:
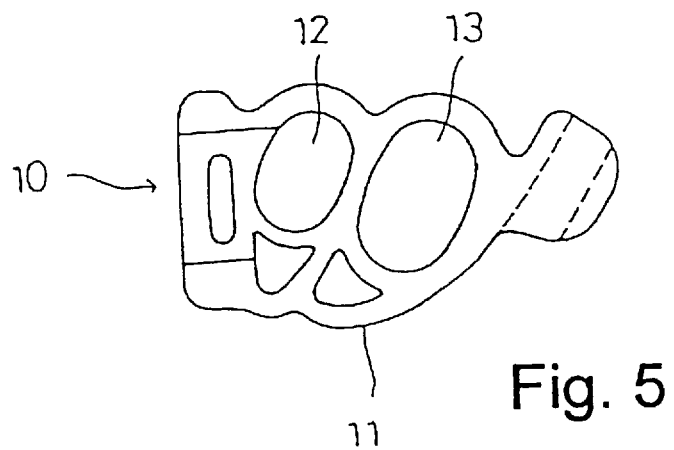
FIG. 5 is a side view of a resin spring finally obtained after the compression step.

As a result, the preform 1 is compressively deformed and its molecular structure is oriented to produce permanent deformation. In this condition, the preform 1 is changed to a spring body 11 retaining the permanent deformation even after removing the external force as shown in FIG. 5. The inner-pressure generating members 12 and 13 enclosed in the spring body 11 are also deformed, thus manufacturing the resin spring 10.

The cylindrical portions 2 and 3 each originally having a circular shape as viewed in side elevation are deformed in their radial directions to become an elliptical shape as shown in FIG. 5. Accordingly, the inner-pressure generating members 12 and 13 are also similarly deformed so as to remain in close contact with the inner circumferential surfaces of the cylindrical portions 2 and 3, respectively.

In this manner, the preform 1 is preliminarily compressed to produce a permanently deformed portion having an oriented molecular structure. Therefore, an anti-setting performance of the resin spring 10 is improved.

The resin spring 10 thus manufactured is used in a front-wheel suspension for a scooter-type motorcycle in the preferred embodiment of the present invention.

Figure 6:
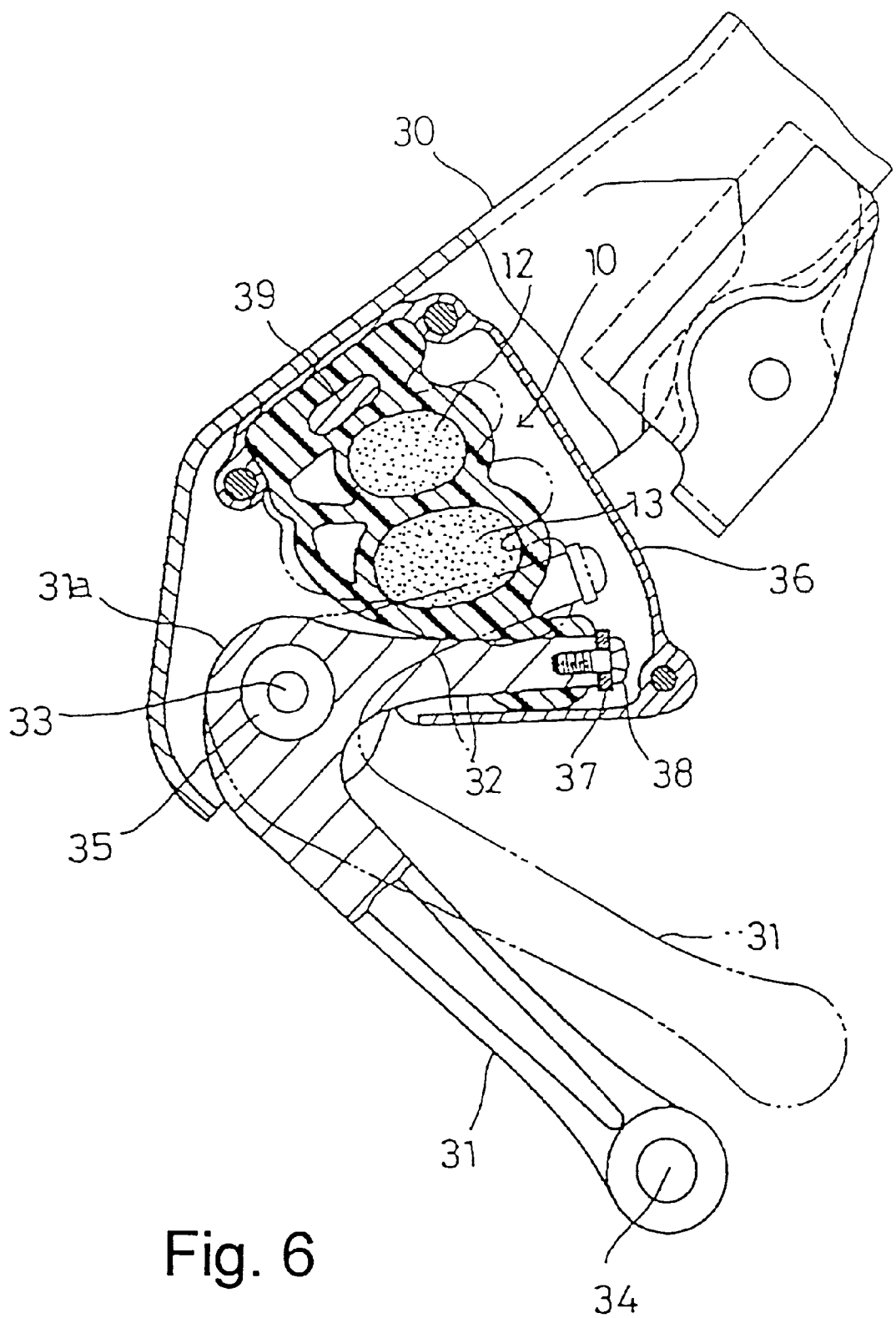
FIG. 6 is a sectional view of an essential part of a front-wheel suspension applying the resin spring.

FIG. 6 is a sectional view showing a damping force generating mechanism in a front-wheel suspension which includes the resin spring 10 in accordance with the present invention. Reference numeral 30 denotes a front fork of the scooter-type motorcycle. A pivot arm 31 acts as a link mechanism. The pivot arm 31 is pivotably supported by a pivot arm bolt 33 to the lower end of the front fork 30.

The pivot arm 31 has a free end to which a front wheel is supported through an axle 34. The front fork 30 has a U-shaped configuration in section including of a front wall and right and left side walls. The right and left side walls are each formed with bolt holes aligned with each other at lower end portions thereof. The pivot arm 31 has a base pivot portion 31a having a through hole in which a bushing 35 is engaged. The base pivot portion 31a of the pivot arm 31 is engaged between the right and left side walls of the front fork 30 so that the bushing 35 is aligned with the bolt holes of the right and left side walls. The pivot arm bolt 33 is inserted through the bolt holes of the right-and left side walls of the front fork 30 and the bushing 35 of the pivot arm 31, thus pivotably supporting the pivot arm 31.

The base pivot portion 31a of the pivot arm 31 has a cylindrical shape. Radially opposite portions of the base pivot portion 31a are expanded in diameter. One of the radially opposite portions includes a flat lever 32 integrally formed thereon. The flat lever 32 extends from the outer circumferential surface of the base pivot portion 31 a in a centrifugal direction.

The pivot arm 31 and the flat lever 32 extend substantially rearward from the base pivot portion 31 a so that an angle of about 60° is formed between the pivot arm 31 and the flat lever 32. Accordingly, the flat lever 32 is located between the front fork 30 and the pivot arm 31.

A substantially sectorial case 36 is located above the base pivot portion 31a of the pivot arm 31 in the vicinity thereof. The sectorial case 36 is fixedly engaged within the front fork 30.

The case 36 is a box-like member having an opening only at its lower end. The resin spring 10 is accommodated in the sectorial case 36.

The lever 32 integral with the pivot arm 31 is inserted in the elongated hole 5a of the projecting portion 5 of the resin spring 10. A screw 38 is threaded into the end of the lever 32 with a washer 37 interposed therebetween. Therefore, the projecting portion 5 of the resin spring 10 is fixed to the lever 32. The assembly of the resin spring 10 and the lever 32 is then forced into the case 36 from the lower opening in the case 36.

The case 36 is formed with a pair of elongated holes aligned with each other. A stop bar 39 is inserted through the elongated hole 4a of the base portion 4 of the resin spring 10. Opposite ends of the stop bar 39 are engaged with the pair of aligned elongated holes of the case 6, thereby fixing the base portion 4 of the resin spring 10 to the case 36.

The projecting portion 5 of the resin spring 10 accommodated in the case 36 is normally kept in contact with a rear wall of the case 36. Therefore, the resin spring 10 is accommodated in the case 36 so that the front end portion of the resin spring 10 is positioned by the stop bar 39 and the rear end portion of the resin spring 10 is movably mounted between the case 36 and the lever 32.

In operation, when the front wheel passes over an uneven spot on the road or receives a load upon braking, the pivot arm 31 and the lever 32 integral therewith are swung from a solid line to a dashed line as shown in FIG. 6. Accordingly, the resin spring 10 is urged by the lever 32 toward the front wall of the front fork 30, so that the spring body 11 of the resin spring 10 is elastically deformed.

The inner-pressure generating members 12 and 13 enclosed in the spring body 11 are also compressed to generate an inner pressure serving as a repulsive force.

When a load is applied to the resin spring 10 in its permanently deformed condition obtained by the above-mentioned compression step, the elastic characteristics of the resin spring 10 allow a sufficient displacement of the resin spring 10. When the applied load is removed, the resin spring 10 is restored to its original shape, exhibiting a hysteresis. Therefore, sufficient energy absorption with a large displacement is obtained.

The resin spring 10 exhibits an anti-setting performance because the preform 1 is preliminarily compressed to orient the molecular structure of the deformed portion. In addition, the inner-pressure generating members 12 and 13 are inserted in the inner closed chambers 2a and 3a of the spring body 11 to thereby reduce creep and greatly improve the anti-setting performance over the conventional resin spring with no inner-pressure generating members.

Furthermore, the inner-pressure generating members 12 and 13 remain in close contact with the inner circumferential surfaces of the cylindrical portions 2 and 3 of the spring body 11. Accordingly, even when the spring body 11 is repeatedly elastically deformed during use of the resin spring 10, no slip occurs between the spring body 11 and the inner-pressure generating members 12 and 13. Therefore, stable load characteristics are obtained and deterioration due to wear is reduced.

In another preferred embodiment of the present invention, the elastomer preform and the inner-pressure generating members may be integrally formed in the first step. Accordingly, the inner-pressure generating members can be kept in close contact with the preform, and close contact therebetween can be maintained after the subsequent compression step. As a result, even when the spring body is repeatedly elastically deformed during use, no slip occurs between the spring body and the inner-pressure generating members. Therefore, the load characteristics are stabilized.

In the above integral forming step, the preform and the inner-pressure generating members are integrally formed so as to exhibit a slope function. In this case, the resin spring finally produced after the compression step does not have an interface where properties rapidly change. Accordingly, the resin spring in this preferred embodiment is less prone to cracking or the like due to stress concentration or the like.

In another preferred embodiment of the present invention, the elastomer preform having inner closed chambers is first formed. In the next step, only the preform is compressed without inserting the inner-pressure generating members into the inner closed chambers, thereby orienting the molecular structure of the permanently deformed portion to carry out an anti-setting treatment.

Finally, an inner-pressure generating resin, for being molded into the inner-pressure generating members, is injected into the inner closed chambers of the spring body obtained by the above anti-setting treatment. The inner-pressure generating members are then formed by using the spring body as a part of the die.

According to this preferred embodiment, the inner-pressure generating resin is injected into the inner closed chambers of the spring body and then molded into the inner-pressure generating members. Accordingly, the spring body and the inner-pressure generating members can be maintained in close contact with each other. Therefore, the occurrence of slip between the spring body and the inner-pressure generating members due to repeated elastic deformation of the resin spring can be eliminated. Accordingly, stable load characteristics are obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of manufacturing a resin spring, comprising the steps of:

forming an elastomer preform having at least one inner chamber;

compressing said elastomer preform by applying an external force to produce a permanently deformed portion to form a spring body having at least one permanently deformed inner chamber; and injecting an inner-pressure generating resin into each of said at least one permanently deformed inner chamber of said spring body, and molding said inner-pressure generating resin into an inner-pressure generating member by using said spring body as a part of a die.

2. The method of manufacturing a resin spring according to claim 1, wherein said deformed portion includes an oriented molecular structure.

3. The method of manufacturing a resin spring according to claim 1, wherein said forming step further comprises the step of forming the elastomer preform to include two of said at least one inner chamber, a flattened projecting portion having a through hole formed therethrough, a base portion having a through hole formed therethrough, a first reinforcing wall extending from the base portion to a first of the inner chambers, and a second reinforcing wall extending from the first inner chamber to a second of the inner chambers.

4. The method of manufacturing a resin spring according to claim 1, wherein said injecting step further comprises the steps of:

providing a lower die and an upper die for covering lower and upper openings in said at least one inner chamber, at least one of said lower and upper dies includes at least one injection hole formed therein; and injecting an inner-pressure generating resin through said at least one injection hole and into said at least one inner chamber of said elastomer preform to form the inner-pressure generating member.

5. The method of manufacturing a resin spring according to claim 3, wherein said compressing step further comprises the steps of:

placing the base portion of the elastomer preform against a surface;

inserting a pressure plate through the through hole formed in the flattened projecting portion; and turning the pressure plate toward the surface to compress the elastomer preform.

* * * * *